UNITED STATES PATENT OFFICE.

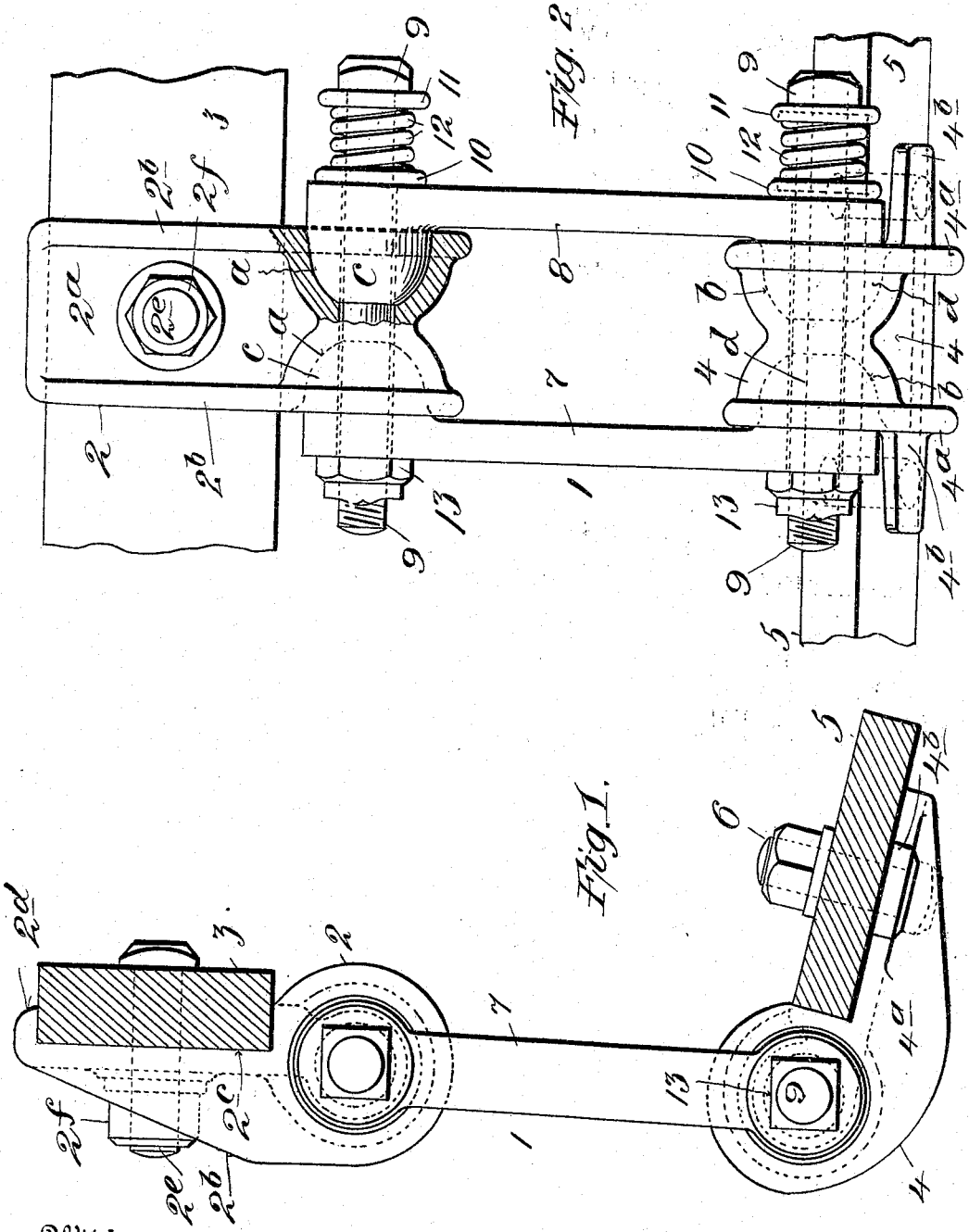

SAMUEL M. CURWEN, OF PHILADELPHIA, PENNSYLVANIA, ASSIGNOR TO THE J. G. BRILL COMPANY, OF PHILADELPHIA, PENNSYLVANIA.

BRAKE-HANGER.

937,512.  Specification of Letters Patent.  Patented Oct. 19, 1909.

Application filed January 8, 1909. Serial No. 471,225.

*To all whom it may concern:*

Be it known that I, SAMUEL M. CURWEN, a citizen of the United States, and a resident of the city and county of Philadelphia, State of Pennsylvania, have invented a new and useful Improvement in Brake-Hangers, of which the following is a specification.

The object of my invention is to provide a device of this class which will readily adjust itself to any inequalities and which will automatically compensate for all wear, and also to provide means for efficiently securing the hanger to the truck transom or other support and to the brake beam. These objects are accomplished by my invention as will appear below.

For a more particular description of my invention reference is to be had to the accompanying drawings forming a part hereof, in which:

Figure 1 is a side elevation of my improved brake hanger. Fig. 2 is a front elevation of the same, partly in section.

Throughout the various views of the drawings similar reference characters designate similar parts.

My improved brake hanger 1, is connected at its upper end with a bracket 2, shown secured to a transom or crossing 3, and at its lower end to a bracket 4 shown secured to a brake beam 5, by a bolt 6, or in any other suitable manner. The brackets 2 and 4 are each provided with suitable sockets $a$, $b$. These sockets are preferably made with an approximately spherical curvature, although this may be varied somewhat, if desired. The hanger 1 is composed of two parallel arms 7 and 8, each of which is provided at each end with a suitable integral projection $c$, $d$, to enter the corresponding sockets $a$, $b$, in the brackets 2 and 4, and fit therein. The parallel arms 7 and 8 are held in proper position by means of suitable bolts 9, which pass loosely therethrough and each of which is provided with washers 10 and 11 between which are coiled springs 12 which are concentric with said bolts 9. The bolts 9 are secured by suitable lock nuts 13 or otherwise, as may be desired.

From the foregoing it is obvious that when my improved hanger is used the arms 7 and 8 can swing in any direction to a limited extent and always remain parallel to each other so that they form what may be termed a universal parallel movement. The springs 12 on the bolts 9 take up any wear, as it occurs, and always prevent rattling; and from time to time the lock nuts 13 may be adjusted to compensate for wear, and keep a proportioned tension on the springs 12.

In order to afford means for readily securing the hanger to its support and to the brake the brackets 2 and 4 are constructed preferably as follows: The bracket 2 is provided with a front recess $2^a$ flanked by the flanges $2^b$, and a rear recess $2^c$, with an overhanging lip $2^d$, within which latter recess the transom 3 is secured by a bolt $2^e$, the nut $2^f$ of which lies within the recess $2^a$ and is flanked by the flanges $2^b$ as shown in Fig. 2. The bracket 4 is likewise formed and secured to the brake beam, except that the lip $2^d$ is omitted and that it is additionally provided with ears $4^b$ to broaden its contact with the brake beam.

What I claim is:

1. In a device of the class described, a pair of brackets having sockets of substantially spherical curvature, a pair of parallel arms having integral substantially similar projections thereon adapted to fit said sockets, bolts passing through said arms, projections, and sockets, springs on said bolts and nuts whereby the tension of said springs may be adjusted.

2. A bracket having a flanged recess on one face, a lipped recess on the other, a beam set in the latter recess substantially spherical sockets at right angles to said recess and a bolt securing the bracket and beam together with a head in the former recess.

3. A bracket having a flanged recess on one face, ears extending from the flanges, a recess in the opposing face, a beam in the latter recess resting on said ears, substantially spherical sockets at right angles to said recess and a bolt securing the beam and bracket together, a head of the bolt lying within the former recess.

4. In a device of the class described a pair of brackets each having oppositely disposed substantially spherical sockets, means for supporting said brackets, a pair of parallel arms each having at opposite ends substantially spherical projections fitting in said sockets, bolts passed through the ends of said arms, projections and sockets, washers on said bolts at one end, springs between said washers and nuts on the other ends of said bolts bearing against the adjacent spring arm.

Signed at Philadelphia.

SAML. M. CURWEN.

Witnesses:
HENRY C. ESLING,
HARRY F. McKILLIP.